United States Patent [19]

Otani

[11] 4,430,389
[45] Feb. 7, 1984

[54] COMPOSITE CYLINDER AND CASTING ALLOY FOR USE THEREIN

[75] Inventor: Tony U. Otani, Lakewood, Calif.

[73] Assignee: Wexco Corporation, Lynchburg, Va.

[21] Appl. No.: 353,236

[22] Filed: Mar. 1, 1982

[51] Int. Cl.$^3$ .................... C22C 29/00; C22C 32/00
[52] U.S. Cl. .................................... 428/627; 420/431; 76/DIG. 11
[58] Field of Search ............... 428/621, 627, 547, 551, 428/565; 420/431; 76/DIG. 11, 107 A; 75/240; 138/145

[56] References Cited

U.S. PATENT DOCUMENTS

| | | | |
|---|---|---|---|
| 1,431,716 | 10/1922 | Arens | 138/145 |
| 1,944,758 | 1/1934 | Roux | 76/107 A |
| 1,944,759 | 1/1934 | Roux | 420/431 |
| 1,950,356 | 3/1934 | De Bats | 75/240 |
| 2,076,356 | 4/1937 | Taylor | 76/107 A |
| 2,124,020 | 7/1938 | Wirth | 420/431 |
| 2,697,043 | 12/1954 | Wade | 148/432 |
| 2,999,309 | 9/1961 | Kuzmick et al. | 428/627 |
| 3,049,753 | 8/1962 | Ogden et al. | 75/240 |
| 3,215,510 | 11/1965 | Kelly et al. | 75/240 |
| 3,258,817 | 7/1966 | Smiley | 428/545 |
| 3,304,604 | 2/1967 | Quaas | 29/527.3 |
| 3,836,341 | 9/1974 | Saltzman et al. | 138/145 |

FOREIGN PATENT DOCUMENTS

| | | | |
|---|---|---|---|
| 56-136952 | 10/1981 | Japan | 420/431 |
| WO80/02569 | 11/1980 | PCT Int'l Appl. | 75/240 |
| 1013328 | 12/1965 | United Kingdom | 75/240 |

*Primary Examiner*—L. Dewayne Rutledge
*Assistant Examiner*—John J. Zimmerman
*Attorney, Agent, or Firm*—Filwider, Patton, Rieber, Lee & Utecht

[57] ABSTRACT

A composite cylinder for use in injection molding or extrusion operations, wherein a lining having excellent wear resistance and corrosion resistance is applied to the inside of an outer housing by a centrifugal casting process utilizing an alloy having tungsten-carbide particles in a nickel-chromium based alloy matrix. The casting alloy has a composition of up to about 57 weight percent tungsten carbide, with the balance a mixture of nickel and chromium and possibly minor amounts of other elements, but without any significant amount of cobalt. Particularly satisfactory results are obtained from an alloy having a composition by weight of 46–57 percent tungsten carbide, 28–40 percent nickel, 5.1–9.5 percent chromium, 1.5–2.9 percent iron, 1.5–2.9 percent silicon, 1.0–2.3 percent boron and 0.5 percent maximum carbon, the total of constituents being 100%.

2 Claims, No Drawings

COMPOSITE CYLINDER AND CASTING ALLOY FOR USE THEREIN

BACKGROUND OF THE INVENTION

This invention relates generally to composite cylinders used in injection molding or extrusion operations, and more particularly to the composition of the inner lining of such composite cylinders.

Injection molding is a process for forming articles from plastics, wherein a heated, fused plastic is forced under pressure into a die cavity to solidify in the shape and size of the cavity. The charge of plastic material to be injected into the die cavity must be heated and pressurized prior to injection, and in one approach the plastic starting material is fed into a hollow cylinder having a screw therethrough. As the screw turns, the plastic is forced into a heated zone of the cylinder ahead of a check ring on the head of the screw, so that a predetermined volume of heated, pressurized plastic is prepared for subsequent injection into the die cavity by a forward movement of the screw and check ring within the cylinder.

Because the economics of injection molding depend upon attainment of long operating lives for the machinery, it is important that the inside of the cylinder have high resistance to wear and corrosion by the heated plastic material. Should the inside of the cylinder wear away so that the inner diameter of the cylinder is enlarged, a clearance develops between the check ring and screw, and the inner wall of the cylinder so that the plastic material leaks back from the pressurized zone, with the result that the necessary pressure for injection molding will not be developed. The cylinder must then be refurbished or replaced, or a larger diameter check ring must be utilized, and in any event the economic production process is interrupted.

Two principal approaches have been taken to provide cylinders having highly wear-resistant and corrosion-resistant inner linings, while at the same time having an outer housing portion with high strength and toughness. In one, the inside of a steel cylinder is nitrided, as by exposing the inner wall of the cylinder to a nitrogen-containing gas such as ammonia, at elevated temperature. This nitriding process results in a relatively thin layer of hardened steel on the inside of the cylinder, having improved wear-resistant properties.

An improved inner layer is achieved by making a composite cylinder using a centrifugal casting process, wherein ingredients suitable for forming an inner layer within the cylinder are loaded into a premachined cylindrical outer steel housing, the ends are sealed, the housing is placed in a furnace at a temperature sufficiently high to melt at least a portion of the ingredients but not the housing, and the cylindrical housing is then rotated rapidly about its cylindrical axis to distribute the molten ingredients in a continuous layer about the inside of the housing. Upon cooling, the inner layer is metallurgically bonded to the cylindrical outer housing, and the inner layer may then be machined or honed to form a smooth bore of constant diameter to receive the screw and check ring.

The centrifugal casting process has proved successful for the manufacture of composite cylinders for injection molding, and a number of alloys have been developed for use in forming the inner lining of the cylinder. Among the materials developed is a heavy-metal alloy of tungsten-carbide particles in a nickel-chromium-cobalt based matrix, wherein the tungsten carbide imparts hardness to the inner layer, and the matrix material imparts toughness and allows the fabrication by the centrifugal casting process. In such alloys developed to date, the amount of tungsten carbide has been limited to a maximum of about 45 weight percent of the total alloy, even though higher tungsten-carbide contents should improve the wear resistance. With such alloys, if the percentage of tungsten carbide is above about 45 weight percent, the matrix material cannot melt and flow properly and an irregular, lumpy, porous inner lining is formed. Accordingly, there has been a need for an improved alloy utilizing higher volume fractions of tungsten carbide to give improved wear resistance to the lining of cylinders for injection molding or extrusion machines. The present invention fulfills this need, and further provides related advantages.

SUMMARY OF THE INVENTION

The present invention provides an improved casting alloy having tungsten carbide in a metallic matrix, which is advantageously used to form inner linings for injection molding cylinders and the like by a centrifugal casting process. The use of a cobalt-free, nickel-chromium based matrix alloy allows the incorporation of higher tungsten carbide contents than previously possible. With this invention, improved wear resistance and corrosion resistance is achieved in the inner lining of the injection molding cylinder, and the use of the relatively expensive cobalt metal is avoided, a significant advantage in the event that cobalt supplies should ever be interrupted.

In accordance with the present invention, an alloy is prepared having up to about 57 weight percent tungsten carbide, with the balance a mixture of nickel and chromium and possibly minor amounts of elements such as iron, silicon, boron, carbon or other elements typically found in commercial alloys, but without cobalt except as a very minor impurity. A particularly advantageous composition is found to be substantially as set forth below:

| INGREDIENT | WEIGHT PERCENT |
| --- | --- |
| tungsten carbide | 46–57 |
| nickel | 28–40 |
| chromium | 5.1–9.5 |
| iron | 1.5–2.9 |
| silicon | 1.5–2.9 |
| boron | 1.0–2.3 |
| carbon | 0.5 maximum, | with the total of the ingredients being 100%.

The tungsten carbide is provided in a finely divided form, such as tungsten carbide powder, and the remaining materials may be provided either as pre-alloyed powder or as individual elements. Upon heating this combination of ingredients to a temperature below the melting point of tungsten carbide but sufficiently high so that the remaining ingredients melt together to form a liquid phase, centrifugally casting the resulting alloy and then cooling, it is found that a gradient in structure is developed, with a tungsten-carbide rich region adjacent the cylindrical outer housing and a matrix-rich region remote from the housing. The matrix-rich region may then be removed by machining or honing to expose the highly wear-resistant and corrosion-resistant tungsten-carbide rich region.

In a preferred embodiment of the invention, tungsten carbide powder and pre-alloyed powder containing the remaining ingredients are sealed in a premachined steel cylindrical outer housing. The housing is then heated to a temperature of from about 1900° F. to about 2250° F. to melt the matrix portion of the alloy and the cylinder is rotated about its cylindrical axis to a rate giving a centrifugal force of about 80 times the force of gravity, while cooling to solidify the melted alloy as an inner layer. The composite cylinder is then slowly cooled to lower temperatures to avoid undesirable residual stresses in the inner layer, and finally the inner layer is honed to form a cylinder for injection molding.

It will be appreciated from the foregoing that the present invention represents an advance in the machinery used for injection molding of plastics. With the alloy of the present invention, higher tungsten carbide contents than previously possible are achieved in a casting alloy which may be used in forming composite cylinders for injection molding machines and the like. Moreover, the use of the expensive ingredient cobalt is avoided, thereby reducing the cost and avoiding dependence upon imports of this critical strategic material.

Other features and advantages of the present invention will become apparent from the following more detailed description which illustrates, by way of example, the principles of the invention.

DETAILED DESCRIPTION OF THE PREFERRED EMBODIMENT

In accordance with the present invention, an alloy is prepared having up to about 57 weight percent tungsten carbide, with the balance a mixture of nickel and chromium and possibly minor amounts of elements such as iron, silicon, boron, carbon or other elements typically found in commercial alloys, but without cobalt except as a very minor impurity. A particularly advantageous composition is found to be substantially as set forth below:

| INGREDIENT | WEIGHT PERCENT |
| --- | --- |
| tungsten carbide | 46–57 |
| nickel | 28–40 |
| chromium | 5.1–9.5 |
| iron | 1.5–2.9 |
| silicon | 1.5–2.9 |
| boron | 1.0–2.3 |
| carbon | 0.5 maximum | with the total of the ingredients being 100%.

The tungsten carbide is present as a finely divided, uncoated powder as, for example, various commercially available tungsten powders that pass 100 mesh, 200 mesh or 325 mesh sizing screens. The remaining ingredients may be provided as individual powders, or, alternatively, the remaining ingredients may be furnished as an alloy which has been previously formed into a pre-alloyed powder. As an example, a satisfactory mixture may be prepared from 46–57 weight percent tungsten carbide and 54–43 weight percent of pre-alloyed powder, the powder having a nominal composition range of 65–75 weight percent nickel, 12–18 weight percent chromium, 3.5–5.5 weight percent iron, 3.5–5.5 weight percent silicon, 2.5–4.5 weight percent boron, and 0.5–1.0 weight percent carbon.

The ingredients are thoroughly blended and a predetermined weight is introduced into a cylinder constituting the outer housing of the composite cylinder used in the injection molding process. The outer housing is normally AISI 4140 or 1020 steel, and is commonly produced in size ranges of ½ inch to 14 inches inside diameter, 2 to 18 inches outside diameter, and 20 to 120 inches in length, depending upon the specific production requirements of the injection molding machinery.

Both ends of the steel cylinder having the blended ingredients therein are capped with steel plates welded into position to seal the cylinder, which is then placed into a heating furnace to melt at least a portion of the ingredients, preferably at a temperature of from about 1900° F. to about 2250° F. At this temperature, the tungsten carbide ingredient is unmelted, but the nickel, chromium, and other ingredients melt together to form a matrix alloy in which the tungsten carbide particles are embedded. After the cylinder has been in the furnace for a period of time sufficient to melt the matrix alloy, it is removed from the furnace and placed onto a set of spinning rolls, which turn the cylinder about its cylindrical axis at a rotational rate sufficient to produce a centrifugal force of about 80 times the force of gravity. As the cylinder turns, the melted ingredients are distributed about the inside of the cylinder to approximately a constant thickness to form an inner layer within the cylindrical outer housing. Simultaneously, the spinning cylinder is cooled with water sprays to solidify the inner layer.

After solidification of the inner layer, its metallurgical microstructure is a composite of tungsten carbide particles embedded in a matrix containing the balance of the ingredients, with possibly a small amount of tungsten carbide dissolved into the matrix. A gradient in structure is found as a result of segregation during centrifugal casting due to the difference in density between the tungsten carbide particles and the matrix, so that the inner layer has a greater tungsten carbide content near the inner wall of the steel cylinder, and a lesser tungsten carbide content remote from the inner wall of the steel cylinder. Thus, the hardness of the inner layer is greatest adjacent the inner wall of the steel outer housing. Additionally, it is observed that the metal comprising the inner layer is metallurgically bonded to the inner wall of the steel housing, to give a strong, sound bond which resists separation of the inner layer from the steel housing. Following the solidification of the matrix alloy, the cylinder is removed from the spinning rolls and placed in a slow-cooling pit or furnace for slow cooling to ambient temperatures to minimize the residual stresses therein.

The innermost surface of the inner layer is typically somewhat rough in texture after the cooling to ambient temperature, as a result of irregularities developed during the solidification step. Additionally, the predetermined weight of the ingredients is selected so that the inner diameter of the inner layer of the composite cylinder is slightly less than the desired final diameter. To remove the structural irregularities and to provide the finished cylinder with a smooth, polished and properly dimensioned inner diameter, the internal wall of the inner layer of the cylinder is then machined or honed to the final size. This honing step also removes the portion of the inner layer having the lower density of tungsten carbide particles, finally exposing to the interior of the composite cylinder the portion of the inner layer having a high fraction of tungsten carbide particles embedded in the matrix material.

The present invention has allowed the preparation of an inner layer having a higher weight fraction of tungsten carbide particles than previously possible, and avoiding the difficulties observed in prior attempts to introduce high weight fractions of tungsten carbide particles, as discussed, for example, at column 3, lines 36-52 of U.S. Pat. No. 3,836,341. There, it was noted that, if the tungsten carbide content is too high, the matrix material cannot melt and flow properly and an irregular, lumpy, porous lining is formed.

Although not wishing to be bound by this possible explanation, it is believed that higher tungsten carbide contents are possible in the present casting alloy as a result of improved fluidity of the matrix. The increased fluidity allows the matrix to flow easily following melting and avoids the irregular, lumpy, porous lining observed in the higher weight fraction tungsten-carbide alloys previously attempted. Improved fluidity was achieved in the presently preferred embodiment by the elimination of cobalt from the ingredients, so that the nickel content is proportionately higher. Although cobalt is typically introduced into tungsten-carbide based heavy metal alloys prepared by a sintering process for improved wettability and sintering kinetics, the structure of the inner layer in the present casting process does not depend upon the mechanisms of sintering, and no cobalt is required. The chromium in the matrix alloy gives good oxidation and corrosion resistance to the inner layer.

The following examples will serve to illustrate the alloy of the present invention.

EXAMPLES

In these examples, the alloys were prepared by melting together the indicated proportions of an uncoated tungsten-carbide powder and a prealloyed nickel-chromium powder, the nickel-chromium powder having a nominal composition in weight percent of 65-75 percent nickel, 12-18 percent chromium, 2.5-4.5 percent boron, 3.5-5.5 percent silicon, 3.5-5.5 percent iron, and 0.5-1.0 percent carbon.

Example 1

An alloy of 25 weight percent tungsten-carbide powder and 75 weight percent of the nickel-chromium powder was heated to 2050° F. and melted. The melt had good fluidity and was easily cast into an ingot.

Example 2

An alloy of 55 weight percent tungsten-carbide powder and 45 weight percent of the nickel-chromium powder was heated to 2050° F. and melted. The melt had sufficient fluidity to be cast into an ingot.

Example 3

An alloy of 57 weight percent tungsten-carbide powder and 43 weight percent of the nickel-chromium powder was heated to 2250° F. and melted. The melt was observed to be somewhat fluid.

Example 4

An alloy of 60 weight percent tungsten-carbide powder and 40 weight percent of the nickel-chromium powder was heated to 2250° F. The alloy would not melt and flow sufficiently for casting.

From examples 1-4, it was determined that alloys having up to about 57 weight percent tungsten carbide have sufficient fluidity for casting. There is no sharp division between castable and uncastable alloys, as the fluidity decreases from clearly sufficient for casting at 55 weight percent tungsten carbide to insufficient for casting at 60 weight percent. The alloy having 57 weight percent tungsten carbide is marginal, but was sufficiently fluid to be castable.

Example 5

An alloy of 50 weight percent tungsten-carbide powder and 50 weight percent of the nickel-chromium powder, the total weight of alloy being 22.76 pounds, was placed in a steel cylinder of 4.5 inches inside diameter, 6 inches outside diameter and 18 inches length. The centrifugal casting process of the above-described preferred embodiment was performed using a melting temperature of 2150° F. The resulting inner layer was sound, smooth and covered the inside of the steel cylinder uniformly and continuously.

Example 6

A composite cylinder was manufactured according to the process described in Example 5, except that the inside diameter of the final cylinder was about 2¼ inches. This cylinder was installed in a 2¼ inch diameter Natco injection molding machine. A cylinder of similar composite construction, except having an inner layer of Xaloy 800, was placed in an adjacent 65 millimeter Van Dorn injection molding machine, whose operating characteristics are believed to be similar to that of the Natco machine. The Xaloy 800-lined cylinder is manufactured by Xaloy Incorporated, New Brunswick, N.J., apparently in accordance with U.S. Pat. No. 3,836,341. The two cylinders were each used to injection mold a plastic consisting of Lexan 500 resin with 10 percent glass-fiber filler under the same conditions for a period of 6 months and then disassembled for inspection. The inner diameter of the cylinder having the Xaloy 800 inner liner had worn and enlarged by 0.005 inches, while the cylinder having an inner lining in accordance with the present invention was unchanged.

Example 7

A composite cylinder was manufactured according to the process described in Example 5, except that the inside diameter of the final cylinder was about 2⅜ inches. This cylinder was used in a 200 ton New Britain injection molding machine. The machine was operated for approximately 2,160 hours over a three month period to injection mold, at separate intervals, polypropylene and fiber-glass reinforced nylon. An inspection revealed that the inner diameter of the inner layer of the cylinder had worn and enlarged a maximum of only 0.0005 inches, an amount well below the wear expected for other materials typically used for forming the inner layers.

Examples 6 and 7 demonstrate that composite injection molding cylinders in accordance with the present invention provide significantly improved performance under service conditions as compared with prior composite cylinders.

Although a particular embodiment of the invention is described in detail for purposes of illustration, various embodiments may be made without departing from the spirit and scope of the invention. Accordingly, the invention is not to be limited except as by the appended claims.

I claim:
1. A composite cylinder, comprising:
an outer housing; and a cobalt-free inner layer around the inner circumference of said housing, said inner layer having a composition consisting essentially of from about 46 up to about 57 weight percent tungsten carbide, with the balance a mixture of nickel and chromium.

2. A composite cylinder comprising:
an outer housing; and
an inner layer around the inner circumference of said housing having a composition substantially as set forth below:

| INGREDIENT | WEIGHT PERCENT |
| --- | --- |
| tungsten carbide | 46–57 |
| nickel | 28–40 |
| chromium | 5.1–9.5 |
| iron | 1.5–2.9 |
| silicon | 1.5–2.9 |
| boron | 1.0–2.3 |
| carbon | 0.5 maximum | with the total of the ingredients being 100%.

* * * * *